United States Patent
Ek

(10) Patent No.: US 8,739,964 B2
(45) Date of Patent: Jun. 3, 2014

(54) CARRIER PUCK AND CONVEYOR SYSTEM

(75) Inventor: Anders Ek, Kullavik (SE)

(73) Assignee: FlexLink Components AB (SE)

( * ) Notice: Subject to any disclaimer, the term of this patent is extended or adjusted under 35 U.S.C. 154(b) by 0 days.

(21) Appl. No.: 13/825,101

(22) PCT Filed: Sep. 26, 2011

(86) PCT No.: PCT/SE2011/051147
§ 371 (c)(1),
(2), (4) Date: Aug. 9, 2013

(87) PCT Pub. No.: WO2012/039674
PCT Pub. Date: Mar. 29, 2012

(65) Prior Publication Data
US 2013/0319827 A1 Dec. 5, 2013

(30) Foreign Application Priority Data
Sep. 24, 2010 (SE) ...................................... 1050994

(51) Int. Cl.
*B65G 35/06* (2006.01)
*B65G 47/53* (2006.01)

(52) U.S. Cl.
CPC .............. *B65G 35/06* (2013.01); *B65G 47/53* (2013.01); *B65G 2201/0261* (2013.01)
USPC ............... 198/803.13; 198/465.2; 198/803.14

(58) Field of Classification Search
CPC .. B65G 17/002; B65G 22/0261; B65G 19/02; B65G 35/06; B65G 17/32

USPC ............ 198/803.14, 867.11, 867.14, 867.15, 198/477.1, 867.13, 465.2
See application file for complete search history.

(56) References Cited

U.S. PATENT DOCUMENTS

| | | | |
|---|---|---|---|
| 4,189,996 A * | 2/1980 | Ackley et al. ............ | 198/803.14 |
| 4,718,349 A | 1/1988 | Wahren | |
| 5,372,240 A | 12/1994 | Weskamp | |
| 5,484,052 A * | 1/1996 | Pawloski et al. ......... | 198/867.05 |
| 5,579,695 A | 12/1996 | Cockayne | |
| 5,941,366 A * | 8/1999 | Quinlan et al. ............ | 198/465.1 |
| 6,068,110 A | 5/2000 | Kumakiri et al. | |
| 6,102,194 A | 8/2000 | Charny | |
| 6,176,369 B1 | 1/2001 | Petrovic | |
| 6,971,506 B2 * | 12/2005 | Hassinen et al. ......... | 198/803.14 |
| 7,219,793 B2 | 5/2007 | Robertsson | |

(Continued)

FOREIGN PATENT DOCUMENTS

WO WO-2012/039673 A1 3/2012
WO WO-2012/039674 A1 3/2012

OTHER PUBLICATIONS

"International Application Serial No. PCT/SE2011/051146, International Preliminary Report on Patentability dated Mar. 26, 2013", 6 pgs.

(Continued)

*Primary Examiner* — James R Bidwell
(74) *Attorney, Agent, or Firm* — Schwegman Lundberg & Woessner, P.A.

(57) ABSTRACT

Carrier puck for a conveyer system, comprising a non-circular lower body, an upper body and an intermediate circular portion connecting the lower body with the upper body, where the rear section of the lower body comprises a concave shape.

11 Claims, 2 Drawing Sheets

(56) References Cited

U.S. PATENT DOCUMENTS

| | | | |
|---|---|---|---|
| 7,320,396 B2 | 1/2008 | Oppermann | |
| 7,600,629 B2 | 10/2009 | Skljarow et al. | |
| 8,047,359 B2 * | 11/2011 | Fellows et al. | 198/867.11 |
| 8,132,664 B2 * | 3/2012 | Paskell et al. | 198/803.14 |
| 2010/0200372 A1 | 8/2010 | Krups et al. | |
| 2013/0256096 A1 | 10/2013 | Ek | |

OTHER PUBLICATIONS

"International Application Serial No. PCT/SE2011/051146, International Search Report mailed Jan. 10, 2012", 4 pgs.

"International Application Serial No. PCT/SE2011/051146, Written Opinion mailed Jan. 10, 2012", 5 pgs.

"International Application Serial No. PCT/SE2011/051147, International Preliminary Report on Patentability dated Mar. 26, 2013", 5 pgs.

"International Application Serial No. PCT/SE2011/051147, Written Opinion mailed Jan. 10, 2012", 4 pgs.

"International Application Serial No. PCT/SE2011/051147, International Search Report mailed Jan. 10, 2012", 4 pgs.

"U.S. Appl. No. 13/825,104, Non Final Office Action mailed Aug. 27, 2013", 6 pgs.

"U.S. Appl. No. 13/825,104, Notice of Allowance mailed Dec. 10, 2013", 7 pgs.

"U.S. Appl. No. 13/825,104, Response filed Nov. 26, 2013 to Non Final Office Action mailed Aug. 27, 2013", 9 pgs.

* cited by examiner

CARRIER PUCK AND CONVEYOR SYSTEM

RELATED APPLICATIONS

This application is a nationalization under 35 U.S.C. §371 from International Application Serial No. PCT/SE2011/051147, filed Sep. 26, 2011 and published as WO 2012/039674 A1 on Mar. 29, 2012, which claims the priority benefit of Sweden Application Serial No. 1050994-1, filed Sep. 24, 2010, the contents of which application and publication are incorporated herein by reference in their entirety.

TECHNICAL FIELD

The present invention relates to a carrier puck comprising a non-circular lower body and a circular intermediate portion to be used in a conveyor system.

BACKGROUND ART

Conveying devices, such as those which are used for moving objects between different stations in a factory, usually comprise a conveying track in the form of a belt or a chain. The conveying tracks can be recessed in a trench with vertical side surfaces. Alternatively, they can be located on the horizontal upper surfaces of the trench or arranged in some other way. The objects to be conveyed are arranged slidably in relation to the conveying tracks, either directly or via supporting means. Larger objects are often conveyed on supporting means also known as pallets, and smaller objects may be conveyed using a small carrier often referred to as a carrier puck. Pallets and pucks are normally shaped in a substantially rectangular or square shape, in order to be able to hold a specific orientation. A specific orientation of the object conveyed by the pallet or puck is often required.

A supporting means is conveyed along the conveying track, which may comprise different work stations. The work stations may either be positioned along the conveying track such that all objects will pass all work stations. In this way, all objects must stop at the same time, regardless if an object is to be manipulated at a work station or not. Such an arrangement is not very flexible and is mostly used when all objects are to be manipulated in the same manner, and when the manipulation requires only a short time duration.

In more flexible systems, where different work stations can perform different operations on different objects, the work stations are separated from the main conveyor track. In such a system, each object can be directed to any work station without disturbing the flow on the main conveyor track. The duration of an operation at a work station will thus not affect the other objects. An object is directed into a side track by a diverting station. In order to be able to divert an object into a side track, the diverting station must be able to catch the right object from the main object flow and to move it out of the main flow into the side track.

The diversion of a pallet or a puck is commonly made by using a diverter arm that reaches in over the main conveyor track when a pallet is to be diverted. In order for the diverter arm to be able to catch the right pallet, there has to be a specified distance between the pallets. The pallet will slide against the diverter arm and will thereby change direction. Such a diverter requires that there is a spacing between the pallets conveyed on the conveyor track. The arm will not be able to part pallets that bear against each other. Such a diverter thus requires a stop function prior to the diverter arm that can stop the pallet flow if the pallets queue up such that only one pallet at the time reaches the diverter.

A commonly known rectangular pallet or puck will work fine in some systems, but there is however still room for improvements.

DISCLOSURE OF INVENTION

An object of the invention is therefore to provide a non-circular carrier puck that can be used in a conveyor system adapted for circular pucks. A further object of the invention is to provide a non-circular carrier puck having a circular intermediate portion. A further object of the invention is to provide a non-circular carrier puck that can easily be disassembled in order to exchange a broken or worn part.

In a carrier puck for a conveyer system, comprising a non-circular lower body, an upper body and an intermediate circular portion connecting the lower body with the upper body, the object of the invention is achieved in that the rear section of the lower body comprises a concave shape.

By this first embodiment of the carrier puck according to the invention, the carrier puck can be used in a conveyor system that is adapted for circular carrier pucks. Due to the circular intermediate portion, the carrier puck can be manipulated by different means at the conveyor track, such as diverters, mergers and positioning stations, in an efficient and cost-effective way. Since the manipulator will grip and hold the carrier puck at the circular intermediate portion, the manipulation will not be hindered by the shape of the lower body or the shape of the upper body. In this way, non-circular pucks can be used in a conveyor system adapted for circular pucks. This is of great advantage since this allows the part conveyed by the puck to be held in a specific orientation throughout the conveyor track, without the need for special orientation aids or specific orientation stations. The non-orientation of the object may be a drawback when using circular pucks. The inventive puck will allow for a more simple system with fewer components, since e.g. specific puck stops or orientation stations will not be required. The concave rear section allows the pucks can ride as close to each other as circular pucks can, and the pucks can still hold a specific orientation.

By allowing non-circular pucks to be used in a conveyor system adapted for circular pucks, an orientation of the puck and thus of the object conveyed by the puck is obtained. This is of advantage for specific objects, e.g. for reading information, such as a bar code on the object or when an operation on the object must be performed with the object in a specific orientation. In this way, it is possible to use the same conveyor system both for objects that does not require a specific orientation and for objects that requires a specific orientation. It is even possible to use both circular pucks and non-circular pucks at the same time. A further advantage is that a non-circular puck can be made larger and thus more stable which is of advantage when larger or heavier objects are to be conveyed.

In one advantageous development of the invention, the radius of the concave shape is larger than the radius of the front section. In this way, the travel through curves and bends is facilitated.

In an advantageous development of the invention, the intermediate portion further comprises a rotatable slide ring. This will improve the performance of the system further since the friction between the puck and the manipulation means, e.g. a diverter disc, will be reduced.

In an advantageous development of the invention, the front section of the lower body comprises a semicircular shape. This will allow the pucks to bear on each other in straight sections and through bends in a conveyor in a reliable way.

In another advantageous development of the invention, the front section of the carrier puck further comprises a guide groove between the circular intermediate portion and a lower contact surface of the front section. This will allow the puck to be securely held to the conveyor track. The advantage is that the puck cannot be removed from the conveyor track, either by accident or by hand.

In another advantageous development of the invention, the front section of the carrier puck further comprises an upper contact surface above the guide groove. In this way, a second bearing surface is obtained, which will reduce the contact pressure on the lower contact surface.

In another advantageous development of the invention, the radius of the upper contact surface and the lower contact surface is larger than the radius of the intermediate portion. In this way, the puck will bear on other pucks and other surfaces with the contact surfaces and not with the intermediate portion.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
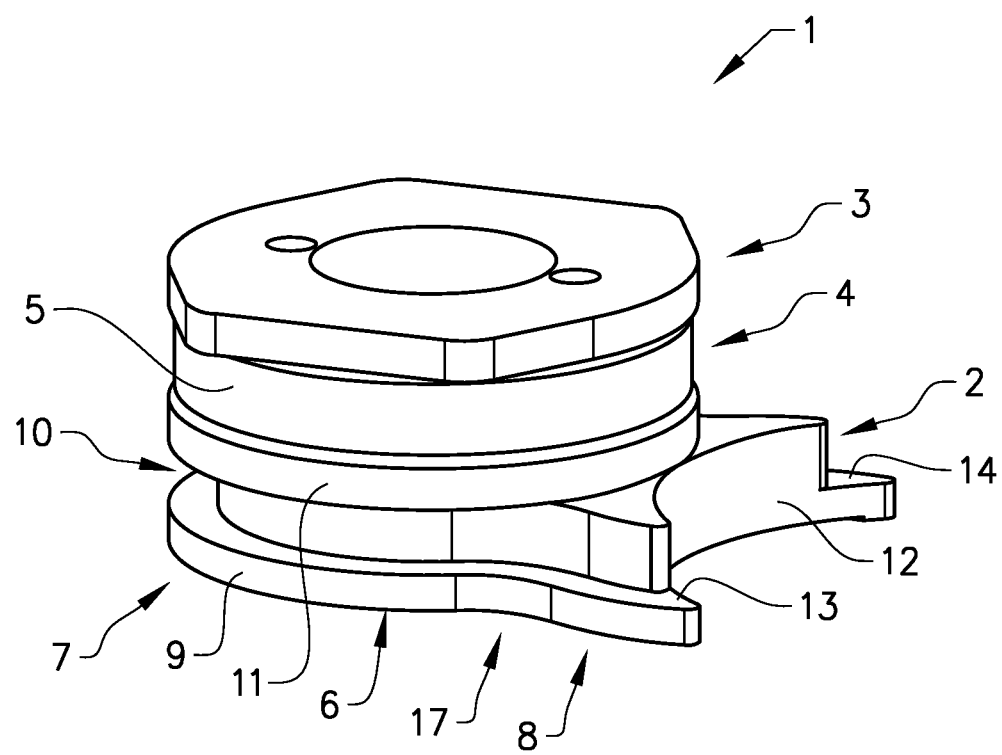
FIG. 1 shows a side view of a carrier puck according to the invention.

FIG. 1 shows a carrier puck according to the invention for a conveyor system. The carrier puck 1 comprises a lower body 2, an upper body 3 and an intermediate portion 4. The lower body 2 has a noncircular shape and comprises a base surface 6 on which the carrier puck bears on the conveyor track. The lower body further comprises a front section 7 and a rear section 8. The front section is in this example provided with a lower contact surface 9, a guide groove 10 and an upper contact surface 11. The upper contact surface 11 is optional. The front section 7 is semicircular shaped and comprises in the shown example a semicircular lower contact surface 9, a semicircular guide groove 10 and a semicircular upper contact surface 11. The radius of the lower contact surface 9 and the upper contact surface 11 is larger than the radius of the intermediate portion 4 and the radius of the guide groove 10. The width of the carrier puck is adapted to fit between the guide rails of the conveyor track, thus the radius of the contact surfaces is half the width of the carrier puck. The front section 7 resembles half a circular puck. The radius of the lower contact surface and the upper contact surface are preferably the same.

The guide groove is optional and can be used for guiding the puck on the conveyor track in systems where a specific guide rail is provided with a protruding sleeve which corresponds to the guide groove. The protruding sleeve is used to hold the puck on the conveyor track such that it cannot be removed from the track. In this way, the puck will be secured to the track and will not be able to fall off or to tip over. The guide groove can also be used at work stations to hold the puck in a fixed position by a holding means.

The rear section is provided with a contact surface 12. The contact surface is in the shown example concave and is adapted to fit the front section of another puck. The lower part of the rear section is provided with two prongs 13, 14 at the outer edges of the rear section. The distance between the outer surfaces of the prongs is the same as the width of the carrier puck. In this way, the front section and the rear section of the carrier puck has the same width, which allows the puck to travel with a defined position on the conveyor track. The lower contact surface 9 and the prongs 13, 14 will guide the puck between the guide rails of the conveyor track. The concave shape of the contact surface 12 allows two pucks to be positioned as close to each other as possible, and at the same time allows the puck to be held in a well-defined position. In this way, a puck and the object conveyed by the puck can be aligned in a specific direction. A puck train made up of a plurality of these pucks will not require more space than circular pucks do, but will still be able to hold a specific orientation.

The radius of the concave shape may correspond to the radius of the front section. The radius of the concave shape may also be larger than the radius of the front section. In one example, the radius of the concave shape is two times larger than the radius of the front section. This facilitates the transport of pucks through curves and bends. The mid portion of the rear contact surface will be substantially at the same distance from the centre of the puck as the front section is, i.e. the distance between the mid portion of the contact surface and the centre of the puck corresponds to the radius of the front section. It is also possible to let the contact surface of the rear section be straight or slightly convex.

The height of the rear section must be lower than the upper part of the upper contact surface 11. In the shown example, the height of the rear section is the same as the lower contact surface and the guide groove. In this way, the rear section can pass underneath the different manipulating means of the conveyor system.

Between the front section and the rear section, the puck is provided with an intermediate waist section 17. The waist section is important since it allows the non-circular puck to be used in conveyor systems adapted for circular pucks. The size and shape of the waist section is thus dependent on the size and shape of the puck. In the shown example, the width of the waist is relatively large since the puck is made short. In this example, the width of the puck at the waist section is reduced by 10-20% compared with the width at the front and rear sections. The waist section allows the puck to travel through the different stations in the conveyor system and is adapted such that the puck can pass the sharpest corner or curve of the system.

The front section or the rear section may be provided with an elastic material, e.g. rubber or plastic, in order to reduce the impact on the object when two pucks bump into each other. The puck is transported on a conveyor track by standing on the base surface. The lower contact surface 9 is used when a puck bears on the rear section 12 of another puck.

The intermediate portion 4 is circular and has a radius that is smaller than the radius of the front section. In this way, the intermediate portion will not protrude from the body of the puck and will thus not bear on another surface during transport of the object. The intermediate portion is used by different manipulating means, e.g. a diverter disc, to hold and move the puck. The intermediate portion will fit in a cut-out in the diverter disc. Preferably, the intermediate portion is provided with a slide ring 15 in order to reduce friction between the intermediate portion and a manipulating means. The dimensions of the intermediate portion and the slide ring are such that the slide ring can easily rotate on the intermediate portion when the puck is assembled. The slide ring 5 is positioned at a height that corresponds to the height of e.g. a diverter disc or another handling unit. This means that the diverter disc will be able to hold the puck by the slide ring. The friction between the slide ring and the holding surface of the diverter disc will hold the slide ring in a fixed position in relation to the holding surface during a diversion of the puck.

The lower body further comprises attachment means that are used to attach the upper body to the lower body. The attachment means may be in the form of a bayonet coupling with bayonet recesses in the lower body and bayonet protrusions in the upper body. Other attachment means are of course also conceivable, such as threads or releasable snap locks. It is also possible to mount the upper body to the lower body by a screw. The attachment means may be dismountable such that the upper body can be detached from the lower body. The advantage of this is that parts of the puck can be replaced when broken or worn, or that the upper body can be exchanged with another body adapted for another use. In this way, the puck or part of the puck can be reused when a production line is altered or shut down.

When the puck does not need to be disassembled, the upper and lower body may also be fixedly mounted to each other, e.g. by glue, bonding, snap locks or the like, depending e.g. on the material of the upper and lower body. The upper and lower body may also be integrated with each other, such that they make up a single part. The puck may also be provided with an identification means, e.g. an RFID-tag that can be either fixedly integrated in the lower body or that can be removable positioned inside the lower body.

The outer dimension of the upper body is preferably smaller than the dimensions of the contact surfaces of the lower body. In this way, the puck will only bear on another puck or another surface by the contact surfaces and not by the upper body. Since the contact surfaces are positioned at the lower part of the puck, this will ensure that the puck is stable. The upper body is adapted to the objects that are to be conveyed. Such objects may include, depending on e.g. the size of the puck, test tubes, mechanical parts, assemblies, medical packages and others. The centre of the puck may be hollow in order to fit e.g. test tubes.

The puck is preferably made from a low-friction material such that the puck will be able to glide against the conveyor track when the pucks are stopped, e.g. at a work station or a diverter station. Such a low-friction material may be a suitable plastic material, e.g. a polyamide, an acetal resin or a conductive acetal resin. At least the lower body of the puck is preferably made from this material. The slide ring may also be made from such a plastic, or may be made from a metal in order to have an improved wear resistance. The slide ring may also be designed as a roller bearing comprising roller elements in order to further reduce the friction and to increase the wear resistance.

Figure 2:
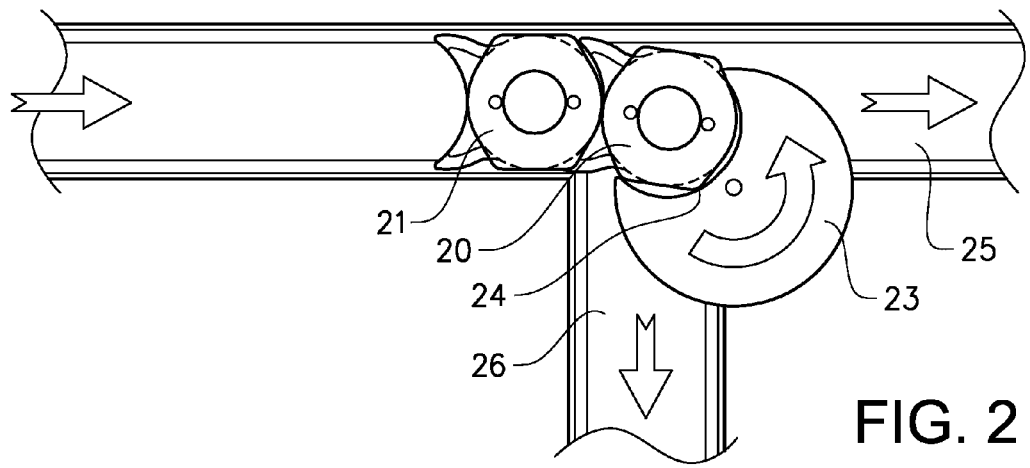
FIGS. 2-4 show an inventive puck being diverted by a diverter disc at a conveyor track.
Figure 3:
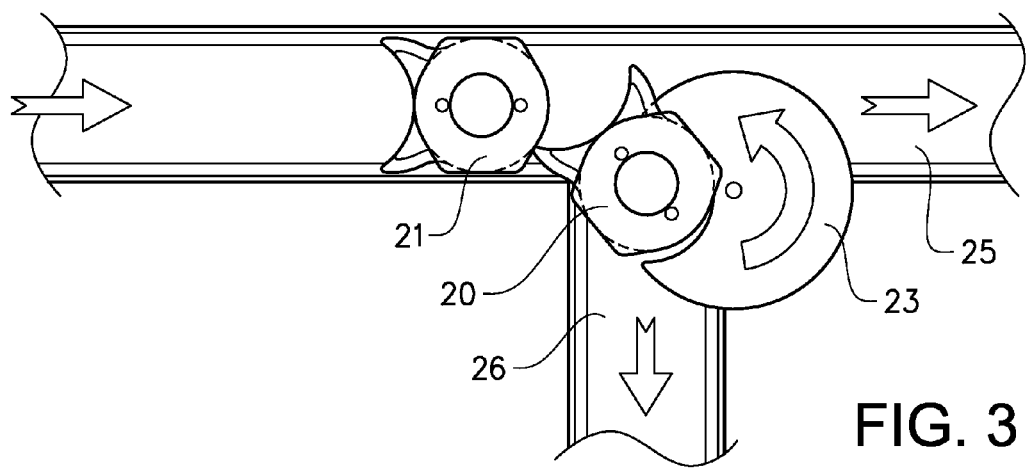
Figure 4:
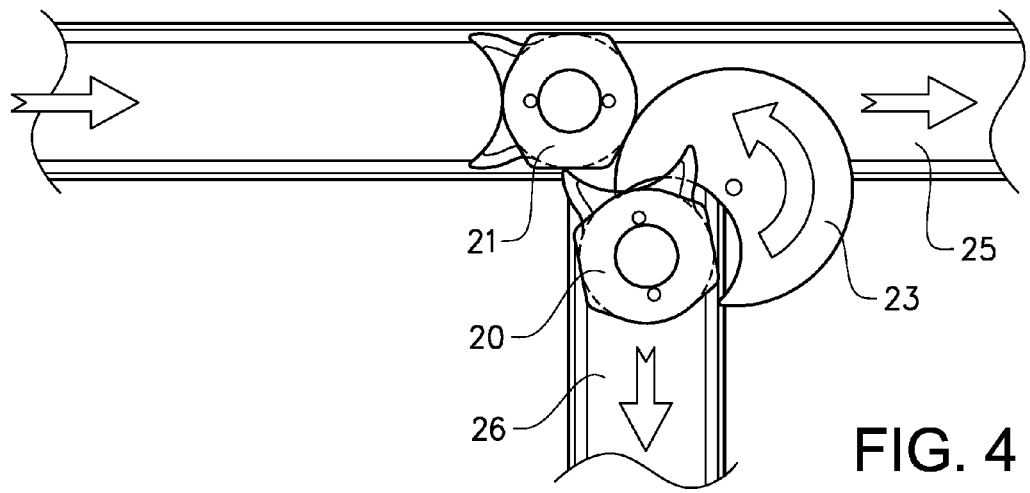

An example of a diversion of a puck is shown in FIGS. 2 to 4. In this example, a plurality of pucks are conveyed on a first conveyor track 25 and a first puck 20 is to be diverted onto a second conveyor track 26 by a diverter disc 23. The travelling direction of the conveyor tracks are indicated with arrows. The diverter disc is provided with a circular holding cut-out 24 corresponding to the size of the intermediate portion, with or without a slide ring, of a puck.

In FIG. 2, the intermediate portion of the first puck 20 has entered the holding cot-out of the diverter disc being in a first position. A puck train with a leading second puck 21 bears on the first puck and is pushed against the first puck with a force that depends on the weight of each puck and the friction between the conveyor track and the puck train.

In FIG. 3, the diverter disc rotates in a counter-clockwise direction indicated by an arrow. The use of a slide ring will allow the slide ring to rotate relative the puck by the diverter disc which reduces wear on the puck and the diverter disc. There is no need to introduce a puck stop in order to stop the puck train since the second puck is stopped by either the first puck or the diverter disc.

In FIG. 4, the diverter disc has rotated to its second position where the first puck is diverted to the second conveyor track. When the intermediate portion of the first puck has left the holding cut-out, the diverter disc can be rotated in a clockwise direction back to the first position in which it will be able to catch the second puck which is next in turn. When the diverter disc rotates back to the first position, the outer surface of the diverter disc will be in contact with the intermediate portion of the second puck. If a slide ring is used, the slide ring will rotate in relation to the second puck, which also reduces wear.

When the intermediate portion of the second puck is caught by the diverter disc, it can either be diverted onto the second conveyor track by a counter-clockwise rotation or it can be forwarded on the first conveyor track by a clockwise rotation. Since the rear section is lower than the slide ring, the rear section can pass the diverter disc without interfering with it. When the puck is forwarded, the outer surface of the diverter disc will bear against the next puck in line.

The carrier puck may also have other shapes and sizes. In the described example, a puck that is as short as possible and that still fits in a conveyor system adapted for circular pucks is described. Other lengths are also possible.

The invention is not to be regarded as being limited to the embodiments described above, a number of additional variants and modifications being possible within the scope of the subsequent patent claims. The puck may have any size and may be made from any suitable material. Other shapes are possible both for the lower body as well as for the upper body.

REFERENCE SIGNS

1: Carrier puck
2: Lower body
3: Upper body
4: Intermediate portion
5: Slide ring
6: Base surface
7: Front section
8: Rear section
9: Lower contact surface
10: Guide groove
11: Upper contact surface
12: Rear contact surface
13: Prong
14: Prong
17: Waist section
20: First puck
21: Second puck
23: Diverter disc
24: Holding cut-out
25: First conveyor track
26: Second conveyor track

The invention claimed is:

1. A carrier puck for a conveyor system, the carrier puck comprising:
a non-circular lower body,
an upper body and an intermediate circular portion connecting the non-circular lower body with the upper body,
wherein a rear section of the non-circular lower body comprises a concave shape.

2. The carrier puck according to claim 1, wherein the intermediate portion further comprises a rotatable slide ring.

3. The carrier puck according to claim 1, wherein a front section of the non-circular lower body comprises a semicircular shape.

4. The carrier puck according to claim 3, wherein the concave shape has a radius that corresponds to the radius of the semicircular front section.

5. The carrier puck according to claim 3 wherein the concave shape has a radius that is larger than the radius of the semicircular front section.

6. The carrier puck according to claim 4, wherein the radius is at least two times larger than the radius of the semicircular front section.

7. The carrier puck according to claim 3, wherein the front section of the non-circular lower body further comprises a guide groove between the intermediate portion and a lower contact surface of the front section.

8. The carrier puck according to claim 7, wherein the front section of the lower body further comprises an upper contact surface above the guide groove.

9. The carrier puck according to claim 8, wherein the radius of the upper contact surface and the lower contact surface is larger than the radius of the intermediate portion.

10. The carrier puck according to claim 1 wherein the non-circular lower body and the upper body are fixedly mounted to each other.

11. A conveyor system, comprising:

at least one conveyor track, and a plurality of carrier pucks, wherein at least one of the plurality of carrier puck comprises a non-circular lower body, an upper body and an intermediate circular portion connecting the non-circular lower body with the upper body, and wherein a rear section of the non-circular lower body comprises a concave shape.

* * * * *